(12) United States Patent
Lv et al.

(10) Patent No.: US 11,168,804 B2
(45) Date of Patent: Nov. 9, 2021

(54) ELECTRONIC EXPANSION VALVE AND COOLING SYSTEM HAVING SAME

(71) Applicant: Zhejiang Sanhua Intelligent Controls Co., Ltd., Zhejiang (CN)

(72) Inventors: Feng Lv, Zhejiang (CN); Tangqing Liu, Zhejiang (CN); Xiaohui Shu, Zhejiang (CN); Xianrang Wei, Zhejiang (CN)

(73) Assignee: Zhejiang Sanhua Intelligent Controls Co., Ltd., Shaoxing (CN)

( * ) Notice: Subject to any disclaimer, the term of this patent is extended or adjusted under 35 U.S.C. 154(b) by 0 days.

(21) Appl. No.: 16/767,561

(22) PCT Filed: Nov. 30, 2018

(86) PCT No.: PCT/CN2018/118535
§ 371 (c)(1),
(2) Date: May 27, 2020

(87) PCT Pub. No.: WO2019/105454
PCT Pub. Date: Jun. 6, 2019

(65) Prior Publication Data
US 2020/0386340 A1 Dec. 10, 2020

(30) Foreign Application Priority Data

Dec. 1, 2017 (CN) .................. 201711255162.X
Dec. 30, 2017 (CN) .................. 201711487611.3

(51) Int. Cl.
*F16K 27/04* (2006.01)
*F16H 57/02* (2012.01)
(Continued)

(52) U.S. Cl.
CPC ............ *F16K 27/048* (2013.01); *F16H 57/02* (2013.01); *F16K 31/502* (2013.01); *F16K 31/53* (2013.01); *F25B 41/31* (2021.01); *F25B 41/35* (2021.01)

(58) Field of Classification Search
CPC ...... F16K 27/048; F16K 31/502; F16K 31/53; F16K 31/50; F16H 57/02; F25B 41/31; F25B 41/35
See application file for complete search history.

(56) References Cited

U.S. PATENT DOCUMENTS

2006/0180780 A1  8/2006  Arai et al.
2006/0247089 A1  11/2006  Guo et al.
(Continued)

FOREIGN PATENT DOCUMENTS

CN  1048744 A   1/1991
CN  1865740 A   11/2006
(Continued)

OTHER PUBLICATIONS

Machine Translation of CN105822822, retrieved May 4, 2021 (Year: 2016).*

(Continued)

*Primary Examiner* — Michael R Reid
(74) *Attorney, Agent, or Firm* — Wolf, Greenfield & Sacks, P.C.

(57) ABSTRACT

An electronic expansion valve and a refrigeration system including the electronic expansion valve are provided. The electronic expansion valve includes a valve seat, a valve needle, a drive mechanism, a planetary gear deceleration mechanism. The drive mechanism serves as an input end of the planetary gear deceleration mechanism, the planetary gear deceleration mechanism has the output inner gear ring, the output inner gear ring is fixedly connected to a screw rod (Continued)

of the transmission mechanism to enable the screw rod to rotate, the screw rod is in threaded connection with a nut, to convert a rotation motion of the screw rod into a linear motion.

15 Claims, 10 Drawing Sheets

(51) Int. Cl.
  *F16K 31/50* (2006.01)
  *F16K 31/53* (2006.01)
  *F25B 41/31* (2021.01)
  *F25B 41/35* (2021.01)

(56) References Cited

U.S. PATENT DOCUMENTS

| | | | |
|---|---|---|---|
| 2006/0261302 | A1 | 11/2006 | Inoue et al. |
| 2008/0067464 | A1 | 3/2008 | Arai et al. |
| 2011/0012038 | A1 | 1/2011 | Lv et al. |
| 2012/0068098 | A1 | 3/2012 | Arai |
| 2016/0290525 | A1 | 10/2016 | Hotta et al. |
| 2016/0369911 | A1 | 12/2016 | Arai |

FOREIGN PATENT DOCUMENTS

| | | |
|---|---|---|
| CN | 203516926 U | 4/2014 |
| CN | 103775717 A | 5/2014 |
| CN | 203656223 U | 6/2014 |
| CN | 203979607 U | 12/2014 |
| CN | 204533762 U | 8/2015 |
| CN | 105822822 A | 8/2016 |
| EP | 0 408 314 A2 | 1/1991 |
| EP | 2 434 181 A2 | 3/2012 |
| JP | 2000-257675 A | 9/2000 |
| JP | 2001-141097 A | 5/2001 |
| JP | 2004-150743 A | 5/2004 |
| JP | 2005-291223 A | 10/2005 |
| JP | 2006-226369 A | 8/2006 |
| JP | 2008-101765 A | 5/2008 |
| JP | 2011-021749 A | 2/2011 |
| JP | 2012-067835 A | 4/2012 |
| JP | 2015-014306 A | 1/2015 |
| JP | 2017-009025 A | 1/2017 |

OTHER PUBLICATIONS

Machine Translation of CN204533762 (Year: 2015).*
International Search Report and Written Opinion for International Application No. PCT/CN2018/118535, dated Jan. 21, 2019.
Extended European Search Report for European Application No. 18882847.9, dated Jul. 15, 2021.
Office Action for Japanese Application No. 2020-529260, dated Jun. 15, 2021.

* cited by examiner

Figure 1

Prior Art

Figure 2

Prior Art

ELECTRONIC EXPANSION VALVE AND COOLING SYSTEM HAVING SAME

This application is a national stage filing under 35 U.S.C. § 371 of International Patent Application Serial No. PCT/CN2018/118535, filed Nov. 30, 2018, which claims priority to Chinese patent application No. 201711255162.X, filed with the Chinese Patent Office on Dec. 1, 2017, titled "ELECTRONIC EXPANSION VALVE AND COOLING SYSTEM HAVING SAME", and Chinese patent application No. 201711487611.3 filed with the Chinese Patent Office on Dec. 30, 2017, titled "ELECTRONIC EXPANSION VALVE AND COOLING SYSTEM HAVING SAME". The contents of these applications are incorporated herein by reference in their entities.

FIELD

The present application relates to the field of refrigeration, and in particular to an electronic expansion valve and a refrigeration system having the same.

BACKGROUND

Figure 1:
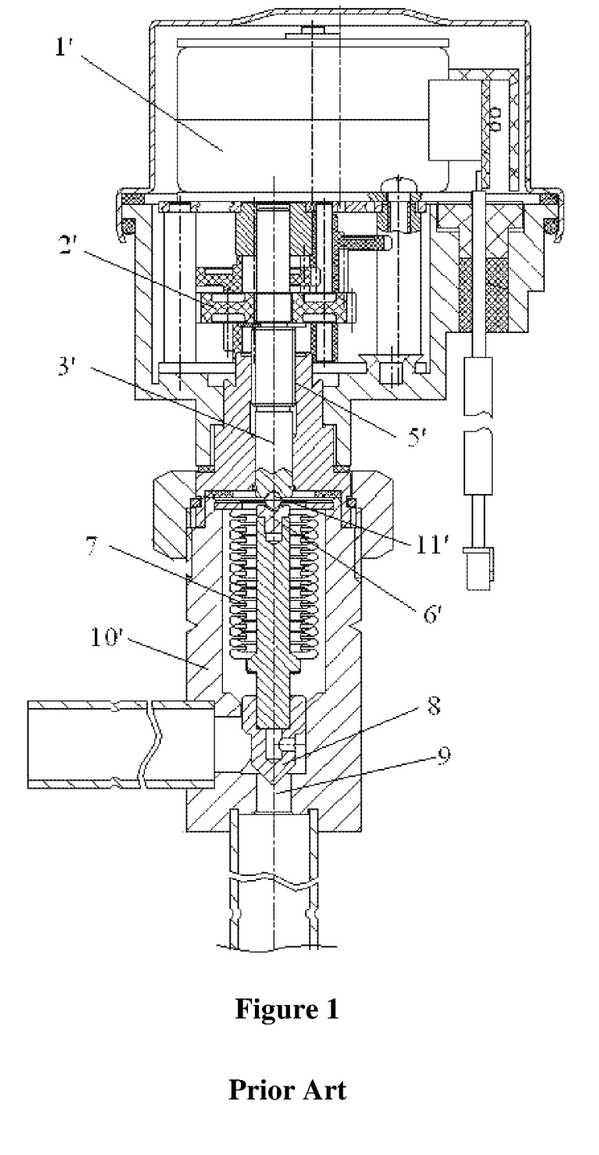
FIG. 1 is a schematic view of an internal structure of an electronic expansion valve described in the background part.

FIG. 1 illustrates a structure of a typical deceleration type electronica expansion valve. A deceleration type electronic expansion valve for a variable frequency air conditioner mainly includes two parts, that is, a valve portion used for flow regulation, and a coil portion used for driving. The coil portion includes a permanent magnet stepping motor 1', a gear decelerator 2' for performing three-stage deceleration and a thread joint structure 5' for converting a rotation motion of a motor into a vertical motion of a screw rod 3'. The valve portion includes core components such as a valve seat 10' and a spring 7 for controlling the lift of a needle 8. Hereinafter, the operation principle of the above electronic expansion valve is described. First, an electronic controller of an air conditioning system controls an output shaft of the stepping motor 1' of the electronic expansion valve to rotate, the motor 1' is matched with the gear decelerator 2' to drive the output shaft of the gear decelerator 2' to rotate, the output shaft of the gear decelerator 2' is matched with the screw rod to drive the screw rod to rotate, and then the screw rod is matched with the thread joint structure 5', so that the screw rod can move up and down. A steel ball 11' is welded to a top end of the screw rod, a bush 6' is arranged at a lower end of the steel ball 11', and the valve needle 8 is connected to the lower end of the bush 6'. When the screw rod is driven by the driving member to move downward, the screw rod abuts against the steel ball 11', and the steel ball 11' abuts against the bush 6', the bush 6' abuts against the valve needle 8, so that the valve needle 8 can synchronously move downward with the screw rod until the valve needle 8 is located at a closed position, that is, a position where the valve needle 8 abuts against the valve seat 10'. When the valve needle 8 is located at the closed position, the spring 7 is in a continually stretched state. When a reverse pulse is applied, the screw rod 3' moves upward, and the valve needle 8 continually moves upward under a restoring force of the spring 7 and a system pressure, such that an opening degree of a valve port portion 9 changes, thereby changing a flowing-through area, thus achieving an object of adjusting a over-heat degree by controlling the flow rate.

Figure 2:
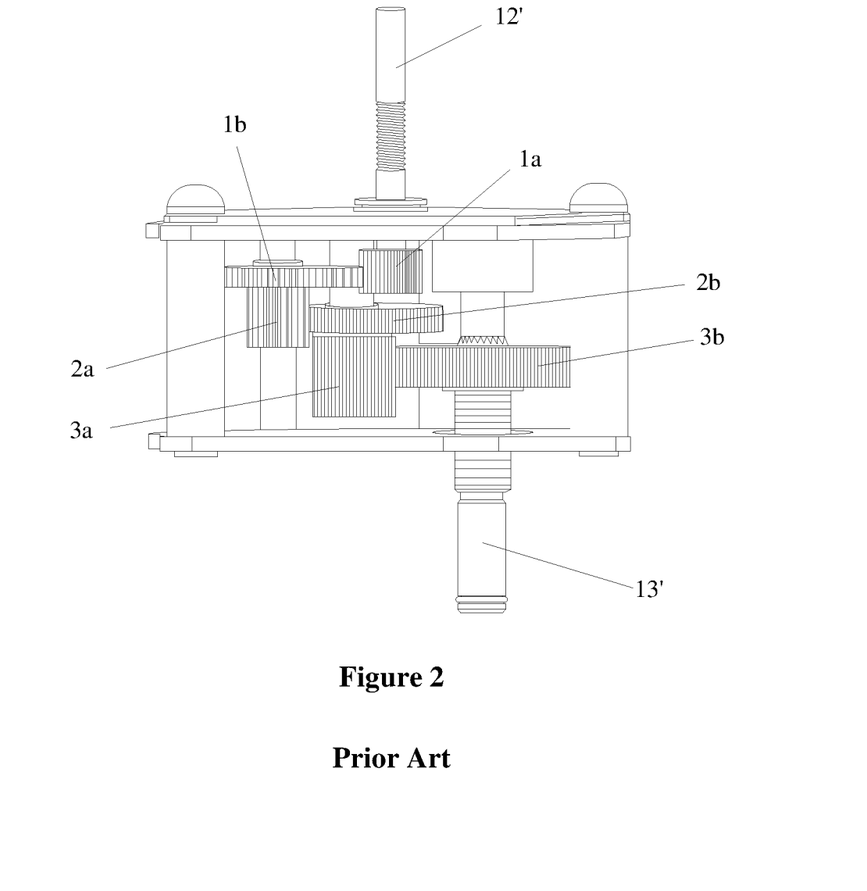
FIG. 2 is a schematic structural view of a deceleration mechanism of the electronic expansion valve shown in FIG. 1.

At present, a deceleration mechanism of the electronic expansion valve is generally a spur gear deceleration mechanism (an ordinary gear train). FIG. 2 illustrates a specific structure of the gear decelerator 2' for performing three-stage deceleration, where a first stage deceleration mechanism includes a gear 1a and a gear 1b, a second stage deceleration mechanism includes a gear 2a and a gear 2b, and a third stage deceleration mechanism includes a gear 3a and a gear 3b. A motor shaft 12' is coaxially arranged with the gear 1a, the motor shaft 12' drives the gear 1a to rotate, and the gear 1a drives the gear 1b to rotate. The gear 1b drives the gear 2a of the second stage deceleration mechanism to rotate, the gear 2a drives the gear 2b to rotate. The gear 2b drives the gear 3a of the third stage deceleration mechanism to rotate, the gear 3a drives the gear 3b to rotate, and finally an output shaft 13' is driven to rotate. For the above deceleration mechanisms, in a case that other conditions remain unchanged (for example, the input torque remains unchanged), in order to increase a control range of the flow rate, it is required to increase the output torque, and in order to improve the control precision, it is required to set a large deceleration ratio. There are the following two ways to increase the deceleration ratio. One way is to increase the deceleration ratio of the gear at each stage, that is, to increase the number of the tooth of a large gear. However, the above structure tends to increase an outer diameter of the large gear, resulting in an increased volume of the gear decelerator. The other way is to increase the number of stages of the gear decelerator. However, the above structure tends to increase the number of the gears, which also results in an increased volume of the gear decelerator. As a result, the requirements of high precision and miniaturization cannot be met. In addition, the increase of the number of the stages may also reduce the transmission efficiency and the stability of the overall system. In addition, there is also a possibility for improving a structure of a gearbox.

SUMMARY

An object of the present application is to provide an electronic expansion valve with a gearbox of a new structure, and a refrigeration system using the electronic expansion valve.

In order to achieve the above object, an electronic expansion valve is provided according to an aspect of the present application, which includes a valve seat, a valve needle, a drive mechanism, and a planetary gear deceleration mechanism. The valve seat has a cavity and a valve port portion which is in communication with the cavity. The valve needle is movably arranged in the cavity, and the valve needle is operable at an open position for opening the valve port portion and a closed position for blocking the valve port portion. The drive mechanism includes a rotor and a coil surrounding an outer circumference of the rotor. The planetary gear deceleration mechanism includes a planetary carrier, a planetary gear and a gearbox, the gearbox includes a box body, a fixed inner gear ring and an output inner gear ring which is movably arranged in the box body. An end of the box body is provided with a folded portion, the folded portion is fixedly connected to the valve seat, and the other end of the box body is fixedly connected to the fixed inner gear ring.

A refrigeration system is further provided according to another aspect of the present application, which includes the above electronic expansion valve.

According to the technical solution of the present application, the electronic expansion valve includes the planetary gear deceleration mechanism, the drive mechanism serves as an input end of the planetary gear deceleration mechanism, the planetary gear deceleration mechanism has the output inner gear ring, the output inner gear ring is fixedly connected to a screw rod of the transmission mechanism to enable the screw rod to rotate, the screw rod is in threaded connection with a nut, to convert a rotation motion of the screw rod into a linear motion. Since the screw rod may move up and down, the valve needle abutting against the screw rod may also move up and down, thereby realizing an object that the valve needle is movable between the open position and the closed position. Since the planetary gear deceleration mechanism adopts an internal meshing gear, the transmission space is fully utilized, such that the space of the whole deceleration mechanism is much smaller than that of the spur gear deceleration mechanism under the same condition. That is, under the condition of the same size, a deceleration ratio of the planetary gear deceleration mechanism is much larger than the deceleration ratio of the spur gear deceleration mechanism. The increase of the deceleration ratio causes a high accuracy in stroke control of the valve needle. Therefore, with the above structure, the adjusting range of the flow rate of the electronic expansion valve can be increased, and the requirements of high precision and miniaturization can be met, thereby addressing the problem in the conventional technology that the electronic expansion valve cannot met the requirements of high precision and miniaturization while increasing the adjusting range of the flow rate.

BRIEF DESCRIPTION OF THE DRAWINGS

Drawings of the specification forming a part of the present application are used to provide a further understanding of the present application. The illustrative embodiments of the present application and the description thereof are used to explain the present application, and do not form improper limitation to the present application. In the drawings.

Reference numerals in the drawings are listed as follows:

| 1 | accommodating space | 6 | cavity |
|---|---|---|---|
| 10 | valve seat | 11 | valve port portion |
| 80 | valve needle sleeve | 81 | mounting section |
| 82 | guiding section | 83 | step surface |
| 20 | valve needle | 21 | abutting convex |
| 30 | drive mechanism | 31 | coil |
| 32 | rotor | 40 | planetary gear deceleration mechanism |
| 41 | planetary carrier | 411 | first mounting shaft |
| 412 | cover plate | 4121 | mounting hole |
| 413 | positioning groove | 414 | rib position |
| 415 | second mounting shaft | 42 | planetary gear |
| 43 | gearbox | 431 | box body |
| 432 | fixed inner gear ring | 433 | output inner gear ring |
| 44 | mandrel | 50 | transmission mechanism |
| 51 | screw rod | 52 | nut |
| 60 | housing | 90 | spring |
| 100 | top frame | 110 | vibration reduction member |

DETAILED DESCRIPTION OF EMBODIMENTS

It should be noted that, in the case of no conflict, the embodiments in the present application and the features in the embodiments may be combined with each other. The present application will be described in detail with reference to the drawings and in conjunction with the embodiments.

As shown in FIG. 3 to FIG. 10, an electronic expansion valve according to an embodiment includes a valve seat 10, a valve needle 20, a drive mechanism 30, a planetary gear deceleration mechanism 40 and a transmission mechanism 50. The valve seat 10 has a cavity 6 and a valve port portion 11 which is in communication with the cavity 6. The valve needle 20 is movably arranged in the cavity 6, and the valve needle 20 is operable at an open position for opening the valve port portion 11 and a closed position for blocking the valve port portion 11. The drive mechanism 30 includes a rotor 32 and a coil 31 surrounding an outer circumference of the rotor 32. The planetary gear deceleration mechanism 40 includes a planetary carrier 41, a planetary gear 42 and a gearbox 43, where the rotor 32, the planetary carrier 41 and the gearbox 43 are coaxially arranged, and the drive mechanism 30 serves as an input end of the planetary gear deceleration mechanism 40, the rotor 32 is fixedly connected to the planetary carrier 41 to drive the planetary carrier 41 to rotate along a axis of the rotor 32. The planetary carrier 41 is provided with a first mounting shaft 411, and the planetary gear 42 is sleeved on the first mounting shaft 411. The gearbox 43 includes a box body 431 fixedly arranged on the valve seat 10, a fixed inner gear ring 432 arranged on the box body 431 and an output inner gear ring 433 movably arranged in the box body 431, where the planetary gear 42 extends into the box body 431 and is meshed with the fixed inner gear ring 432 and the output inner gear ring 433, and the output inner gear ring 433 supports the planetary carrier 41. The transmission mechanism 50 includes a nut 52 fixed on the valve seat 10 and a screw rod 51 which is matched with an internal thread of the nut 52, a first end of the screw rod 51 is fixedly connected to the output inner gear ring 433, a second end of the screw rod 51 abuts against the valve needle 20 to enable the valve needle 20 to move between the open position and the closed position.

According to the technical solution, the electronic expansion valve includes the planetary gear deceleration mechanism 40, the drive mechanism 30 serves as the input end of the planetary gear deceleration mechanism 40, the planetary gear deceleration mechanism has the output inner gear ring 433, the output inner gear ring 433 is fixedly connected to a screw rod 51 of the transmission mechanism 50 to enable the screw rod 51 to rotate, the screw rod 51 is in threaded connection with a nut 52, to convert a rotation motion of the screw rod 51 into a linear motion. Since the screw rod 51 may move up and down, the valve needle 20 abutting against the screw rod 51 may also move up and down, thereby realizing an object that the valve needle 52 is movable between the open position and the closed position. Since the planetary gear deceleration mechanism 40 adopts an internal meshing gear, the transmission space is fully utilized, such that the space of the whole deceleration mechanism is much smaller than that of a spur gear deceleration mechanism under the same condition. That is, under the condition of the same size, a deceleration ratio of the planetary gear deceleration mechanism 40 is much larger than the deceleration ratio of the spur gear deceleration mechanism. The increase of the deceleration ratio causes a high accuracy in stroke control of the valve needle 20. Therefore, with the above structure, the adjusting range of the flow rate of the electronic expansion valve can be increased, and the requirements of high precision and miniaturization can be met, thereby addressing the problem in the conventional technology that the electronic expansion valve cannot met the requirements of high precision and miniaturization while increasing the adjusting range of the flow rate.

It should be noted that, in the present embodiment, the planetary carrier 41, the rotor 32, the output inner gear ring 433 and the screw rod 51 are supported by the threads of the nut 52. The operation process of the electronic expansion valve is specifically described below.

When the rotor 32 rotates, the planetary carrier 41 fixedly arranged with the rotor 32 rotates along with the rotor 32. In this case, the planetary gear 42 revolves around a rotation axis of of the planetary carrier 41. The revolving planetary gear 42 starts to rotate after being meshed with the fixed inner gear ring 432. The rotating planetary gear 42 is meshed with the output inner gear ring 433, so that the output inner gear ring 433 rotates. Since the output inner gear ring 433 is fixedly connected to the screw rod 51, the screw rod 51 will rotate along with the screw rod 51. In a rotating process of the screw rod 51, the screw rod 51 is matched with the nut 52 fixed on the valve seat 10, to convert the rotation motion of the screw rod 51 into the linear motion. As the screw rod 51 moves downward, the output inner gear ring 433 fixedly connected with the screw rod 51 will also move downward. The output inner gear ring 433 supports the planetary carrier 41 and the rotor 32 fixed to the planetary carrier 41, so that as the output inner gear ring 433 moves downward, the planetary carrier 41 and the rotor 32 will also move downward along with the output inner gear ring 433. Similarly, as the screw rod 51 moves upward, the output inner gear ring 433 fixedly connected with the screw rod 51 will also move upward. The output inner gear ring 433 supports the planetary carrier 41 and the rotor 32 fixed to the planetary carrier 41, so that as the output inner gear ring 433 moves upward, the planetary carrier 41 and the rotor 32 will also move upward along with the output inner gear ring 433. Therefore, as the screw rod 51 moves up and down, the planetary carrier 41 and the rotor 32 will also move up and down along with the screw rod 51.

Figure 3:
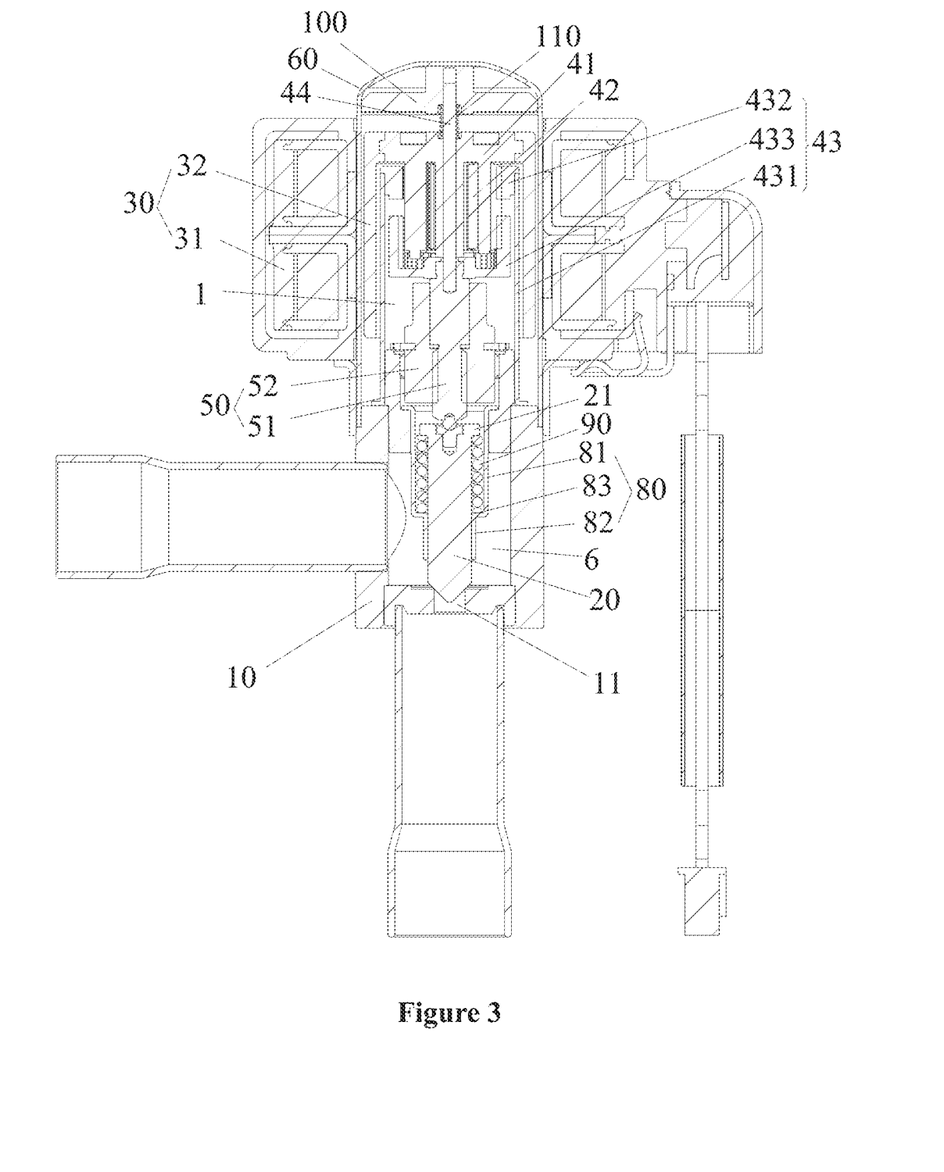
FIG. 3 is a schematic longitudinal-section view of an electronic expansion valve according to an embodiment of the present application.

As shown in FIG. 3, in the present embodiment, the electronic expansion valve further includes a housing 60. The housing 60 covers an upper portion of the valve seat 10 and is supported by the valve seat 10. The housing 60 has an accommodating space 1 which is in communication with the cavity 6. The rotor 32, the planetary gear deceleration mechanism 40 and the transmission mechanism 50 are arranged in the accommodating space 1, and the coil 31 surrounds an circumference of the housing 60. With the above structure, precision components such as the rotor 32, the planetary gear deceleration mechanism 40 and the transmission mechanism 50 can be arranged in a closed space, thereby preventing these precision components from being affected by external water vapor and dust, thus improving the service life of the electronic expansion valve.

In the present embodiment, the planetary carrier 41 and the rotor 32 press on the output inner gear ring 433 under the gravity of the planetary carrier 41 and the rotor 32. Although the above structure is simple, once the electronic expansion valve vibrates during operation (for example, the drive mechanism 30 vibrates while operating), the planetary carrier 41 and the rotor 32 may oscillate up and down under the above vibration, causing the planetary carrier 41 and the rotor 32 to mutually collide with the output inner gear ring 433 or other components, to generate abnormal noise, resulting in poor user experience. In order to address the above problem, as shown in FIG. 3, in the present embodiment, the electronic expansion valve further includes a top frame 100 and a vibration reduction member 110. The top frame 100 is fixedly arranged in the accommodating space 1 and is located above the planetary carrier 41. The vibration reduction member 110 is arranged between the top frame 100 and the planetary carrier 41 to provide a downward abutting force for the planetary carrier 41. With the above structure, the planetary carrier 41 presses on the output inner gear ring 433 under its own gravity as well as a downward abutting force applied by the vibration reduction member, so that the collision between the planetary carrier 41 and the rotor 32 and the output inner gear ring 433 or other components can be greatly reduced, thereby greatly reducing the abnormal noise, thus improving the user experience. It should be noted that the magnitude of the abutting force applied to the planetary carrier 41 by the vibration reduction member 110 may be adjusted according to actual conditions.

Alternatively, the top frame 100 may be omitted, and the vibration reduction member 110 is directly arranged between the top of the housing and the planetary carrier 41, which can also achieve the object of the present application.

As shown in FIG. 3 to FIG. 6, in the present embodiment, the planetary gear deceleration mechanism 40 further includes a mandrel 44, the mandrel 44 sequentially passes through the top frame 100, the planetary carrier 41 and the screw rod 51 from top to bottom, and the mandrel 44 is in clearance fit with the top frame 100, the planetary carrier 41 and the screw rod 51. The above structure is simple, which can ensure a coaxial arrangement of the planetary carrier 41 and the screw rod 51.

As shown in FIG. 3, in the present embodiment, the vibration reduction member 110 is a vibration reduction spring, and the vibration reduction spring is sleeved on the mandrel 44. A first end of the vibration reduction spring abuts against a bottom surface of the top frame 100, a second end of the vibration reduction spring abuts against a top surface of the planetary carrier 41. The vibration reduction spring is sleeved on the mandrel 44, so that deviation cannot be caused when the vibration reduction spring is compressed, and the vibration reduction spring can provide a predetermined abutting force for the planetary carrier 41, thereby ensuring the noise reduction effect. In addition, with the above structure, the vibration reduction spring is sleeved on the existing mandrel 44 and it is unnecessary to provide other components matched with the vibration reduction spring, such that the production cost is reduced.

Figure 5:
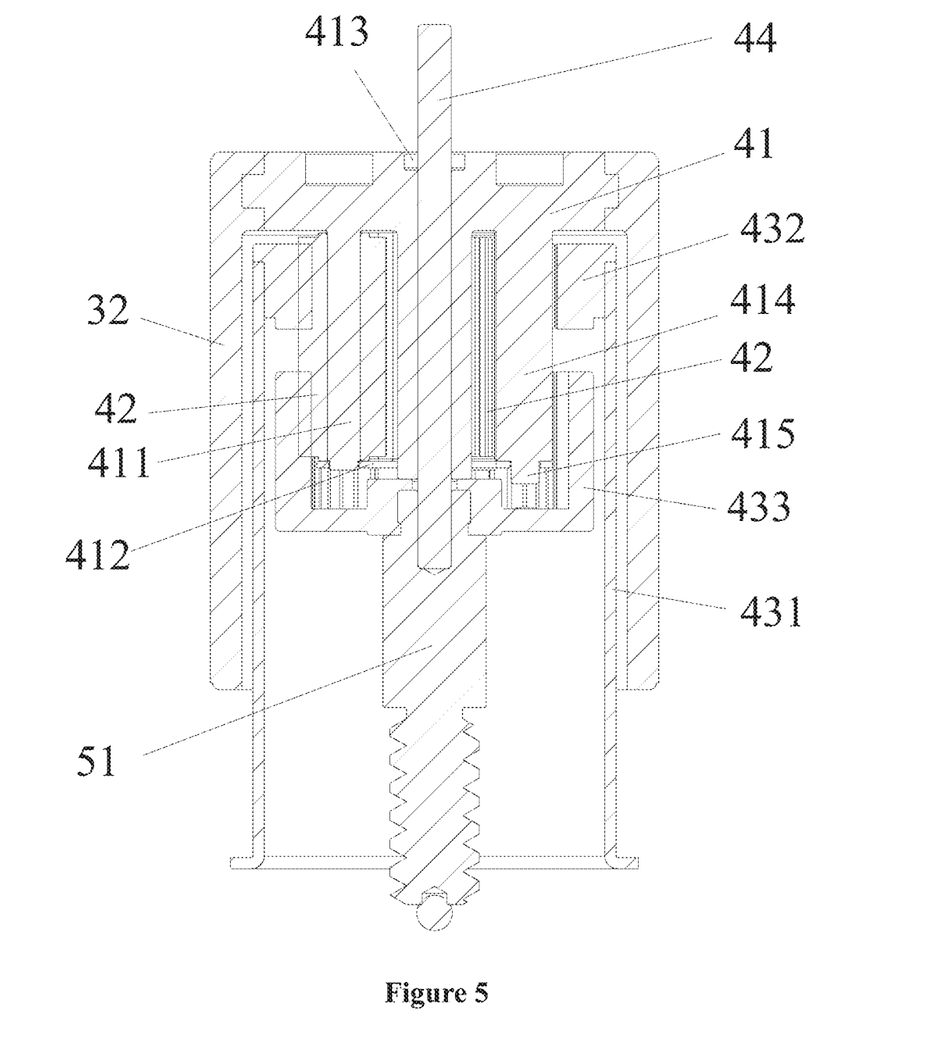
FIG. 5 is a schematic longitudinal-section view of the planetary gear deceleration mechanism of the electronic expansion valve shown in FIG. 4 which is matched with a rotor and a screw rod.
Figure 6:
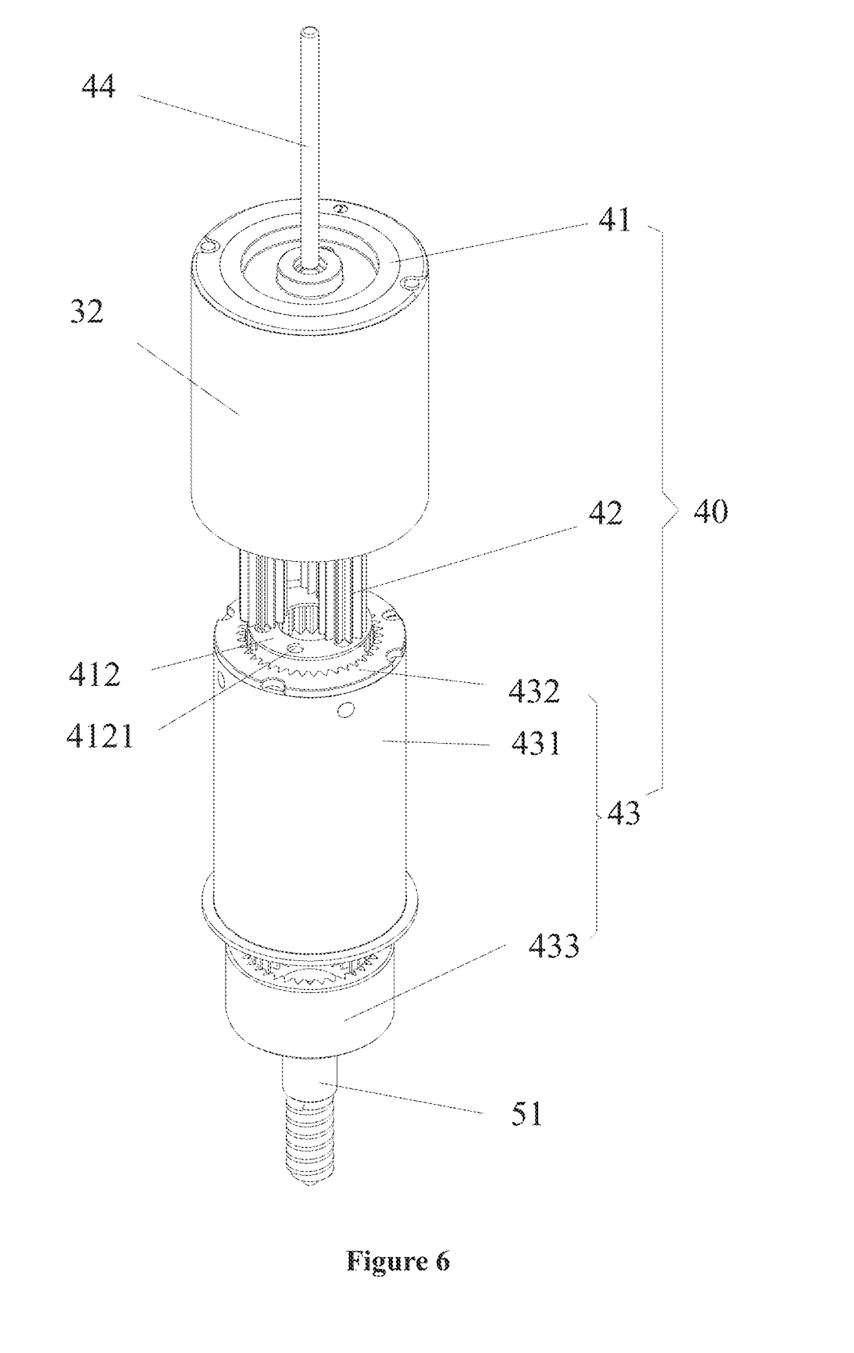
FIG. 6 is a schematic exploded view of the planetary gear deceleration mechanism of the electronic expansion valve shown in FIG. 4 which is matched with a rotor and a screw rod.

As shown in FIG. 3, FIG. 5 and FIG. 6, in the present embodiment, a positioning groove 413 is arranged on a top surface of the planetary carrier 41, the second end of the vibration reduction spring abuts against a bottom of the positioning groove 413. With the above structure, the deviation caused when the vibration reduction spring is compressed can be further avoided.

In the present embodiment, the rotor 32 is integrally formed with the planetary carrier 41 by injection molding, and/or the screw rod 51 is integrally formed with the output inner gear ring 433 by injection molding. The above structure is simple, which is processed conveniently. In addition, with the above structure, it can be avoided that the rotor 32 is fixed on the planetary carrier 41 through other fasteners, thereby greatly improving the assembling efficiency, thus reducing the production cost. It should be noted that, during processing, the planetary carrier 41 is firstly machined and formed, and then the rotor 32 is arranged on the planetary carrier 41 by injection molding. However, it should be understood by those skilled in the art that the rotor 32 can be fixed on the planetary carrier 41 in other ways such as welding, bonding, screwing and the like, in addition to the integral injection molding.

Figure 7:
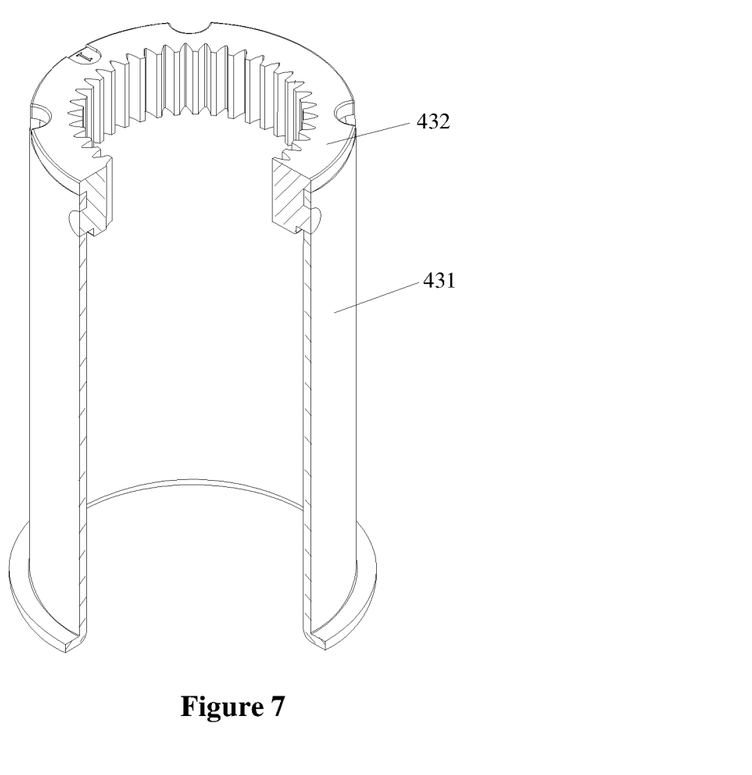
FIG. 7 is a partial-section view of a box body of the electronic expansion valve shown in FIG. 4 that is matched with a fixed inner gear ring.
Figure 8:
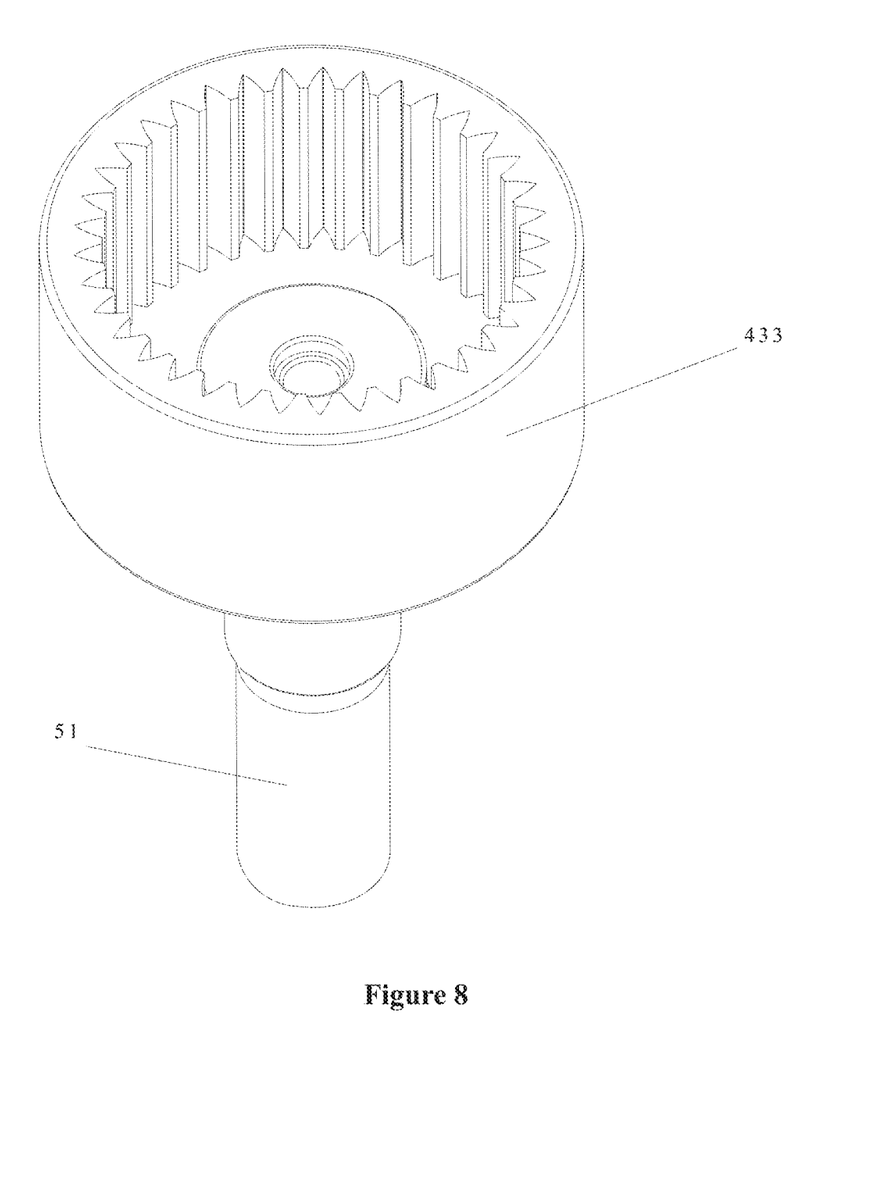
FIG. 8 is a perspective view of an output inner gear ring and a screw rod of the electronic expansion valve shown in FIG. 4.
Figure 9:
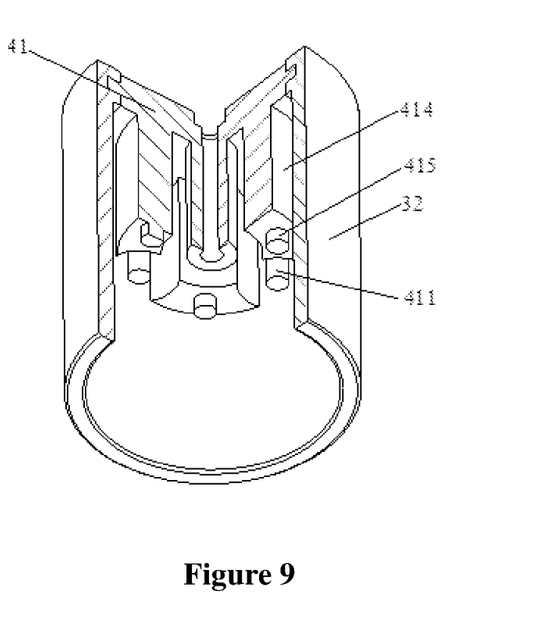
FIG. 9 is a partial section view of a rotor and a planetary carrier of the electronic expansion vale shown in FIG. 4.
Figure 10:
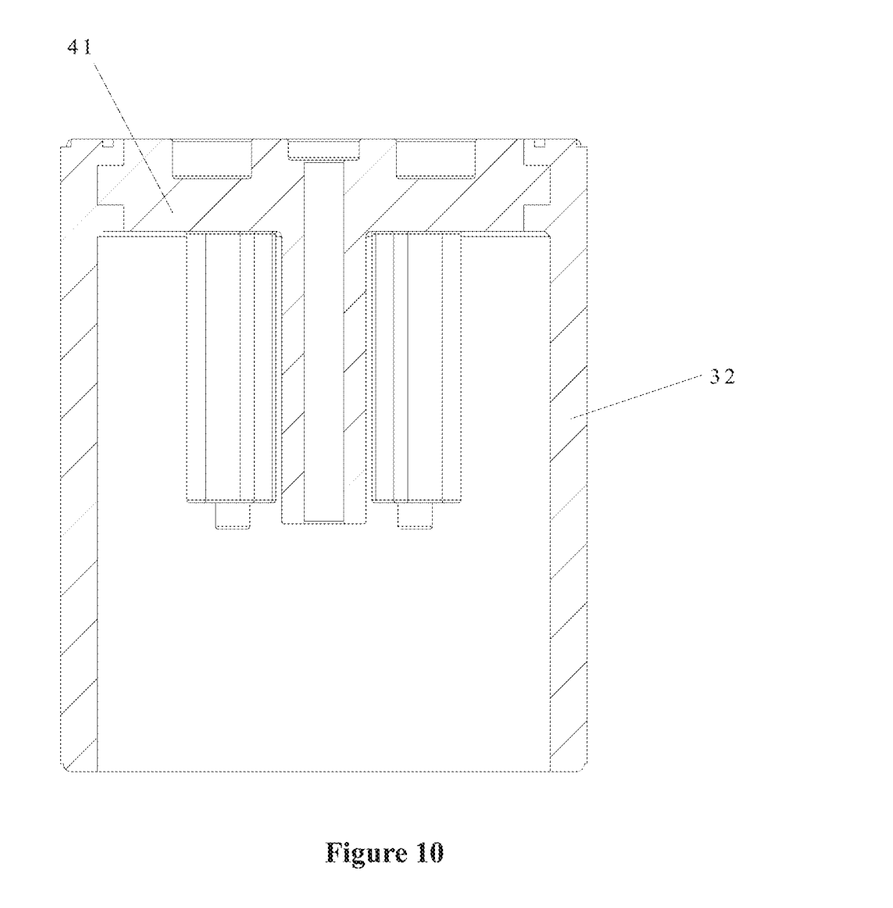
FIG. 10 is a longitudinal-section view of the rotor and the planetary carrier shown in FIG. 9.

As shown in FIG. 7, in the present embodiment, the fixed inner gear ring 432 is integrally formed with the box body 431 by injection molding. Specifically, the box body 431 is cylindrical, and the fixed inner gear ring 432 is located at an upper end of the box body 431. A lower end of the box body 431 is fixed on the valve seat 10 by welding.

Specifically, the box body 431 is substantially of a cylindrical structure, one end of the box body 431 is provided with a folded portion 431a, the folded portion 31a is fixedly connected to the valve seat 10 by welding. The other end of the box body 431 is provided with a through portion 431b passing through the box body 431, the number of the through portions 431b is one or more. Specifically, in the manufacturing process, the box body 431 may be placed into a die firstly, and then the fixed inner gear ring 432 may be molded on the box body 431 by injection molding, the through portion 431b is filled with a part of the material of the fixed inner gear ring 432. Due to the arrangement of the through portion 431b, the fixed inner gear ring 432 is tightly connected with the box body 431, which cannot be separated from the box body 430, thereby realizing high connection strength.

Apparently, various different transformations may be made to the shape and the number of the through portion 431b, for example, multiple through portions 431b are evenly or unevenly arranged along the cylindrical peripheral wall of the box body 431, for example, by drilling, which can be achieved simply, and facilitates the batch production. The longitudinal section shape of the through portion 431b is not limited to a circular shape, which may also be a rectangular shape, a triangular shape or an irregular shape. Those skilled in the art can understand that the longitudinal section shape of the through portion 431b may be any shape, as long as the through portion 431b can penetrate the peripheral wall of the box body 431, to enable the plastic material to flow into the through portion 431b when molding the fixed inner gear ring by injection molding, to fill the through portion 431b.

The above structure is simple and convenient to process. In addition, with the above structure, it can be avoided that the fixed inner gear ring 432 is fixed on the box body 431 through other fasteners, thereby greatly improving the assembling efficiency, thus reducing the production cost.

As shown in FIG. 3 to FIG. 6, in the present embodiment, the number of the first mounting shaft 411 is one or more, and the first mounting shaft 411 is arranged along a peripheral direction of the planetary carrier 41, and the planetary gear 42 is arranged in one-to-one correspondence with the first mounting shaft 411. Specifically, the number of the first mounting shaft 411 may be one, and the number of the planetary gear 42 is also one in this case, the first mounting shaft 411 is arranged at the outer circumference of the axis of the planetary carrier 41.

Figure 4:
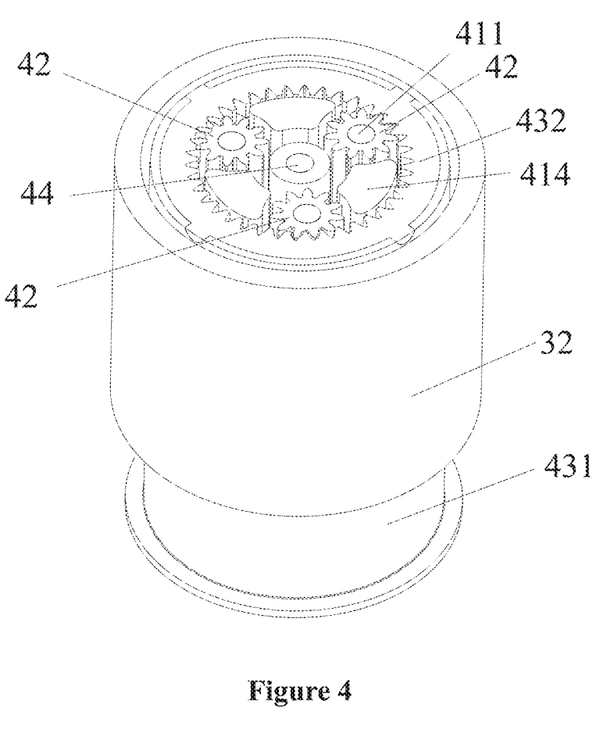
FIG. 4 is a partial-section view of a planetary gear deceleration mechanism of the electronic expansion valve shown in FIG. 3 which is matched with a rotor and a screw rod.

Preferably, as shown in FIG. 4 and FIG. 6, the number of the first mounting shaft 411 is more than one (more than two, such as two, three, four . . . ), and the more than one first mounting shaft 411 is spaced along the peripheral direction of the planetary carrier 41, and the number of the planetary gear 42 is also more than one (more than two, such as two, three, four . . . ) which corresponds to that of the first mounting shaft 411. With the above structure, the planetary gear deceleration mechanism 40 operates more stably. Preferably, in the present embodiment, the number of the first mounting shafts 411 is three, the planetary gears 42 are arranged in one-to-one correspondence with the first mounting shaft 411, and the number of the planetary gears 42 is also three.

As shown in FIG. 4 and FIG. 6, the planetary gears 42 are sleeved on the first mounting shafts 411 in one-to-one correspondence. During operation, each of the planetary gears 42 rotates at a high speed, in order to prevent the planetary gear 42 from being disengaged from the first mounting shaft 411, as shown in FIG. 4, in the present embodiment, the planetary carrier 41 further includes multiple second mounting shafts 415 and multiple rib positions 414 arranged in one-to-one correspondence with the multiple second mounting shafts 415. Each of the rib positions 414 wraps the outer circumference of the corresponding second mounting shaft 415, and the first mounting shaft 411 and the second mounting shaft 415 are spaced from each other. The planetary gear deceleration mechanism 40 further includes a cover plate 412, mounting holes 4121 which are respectively matched with the first mounting shaft 411 and the second mounting shaft 415 are arranged on the cover plate 412, and a top surface of the cover plate 412 abuts against a bottom surface of the rib position 414. In the above structure, an upper end of the planetary gear 42 is blocked by the planetary carrier 41, a lower end of the planetary gear 42 is blocked by the cover plate 412, such that the planetary gear 42 is prevented from being disengaged from the first mounting shaft 411. In the present embodiment, the rib position 414 is integrally formed with the second mounting shaft 415 by injection molding.

As shown in FIG. 3, in the present embodiment, the electronic expansion valve further includes: a valve needle sleeve 80 and a spring 90. The valve needle sleeve 80 is sleeved on the valve needle 20 and is fixedly arranged on the valve seat 10, and the valve needle 20 is movably arranged in the valve needle sleeve 80. The valve needle sleeve 80 includes a mounting section 81 and a guiding section 82 located below the mounting section 81, and a step surface 83 is formed at a connection position of the mounting section 81 and the guiding section 82, the guiding section 82 is matched with the valve needle 20. The spring 90 is located in the mounting section 81, an end of the spring 90 abuts against an abutting convex 21 at a top of the valve needle 20, and the other end of the spring 90 abuts against the step surface 83. When the valve needle 20 moves from the closed position to the open position, an upward elastic restoring force is applied to the valve needle 20 by the spring 90.

Specifically, when it is required to open the valve port portion 11 through the valve needle 20, the screw rod 51 rotates and moves upward, and the abutting force at the top of the valve needle 20 is reducing. When the downward force applied by the screw rod 51 to the valve needle 20 is less than the upward elastic restoring force applied to the valve needle 20, the valve needle 20 starts to have a trend of moving upward, and the magnitude of the stroke in which the valve needle 20 moves upward is determined by the stroke in which the screw rod 51 moves. The above structure is simple, the spring 90 is mounted by the mounting section 81f, and the valve needle 20 is guided by the guiding section 82.

A refrigeration system (not shown in the drawings) is further provided according to the present application, which includes the above electronic expansion valve. Since the electronic expansion valve has advantages such as high precision and small volume, the refrigeration system also has the same advantages. The above descriptions only show preferred embodiments of the present application, and are not intended to limit the present application. For those skilled in the art, various modifications and variations may be made to the present application. Any modification, equivalent substitutions and improvements made within the spirit and principle of the present application should fall within the protection scope of the present application.

The invention claimed is:

1. An electronic expansion valve, comprising:
   a valve seat having a cavity and a valve port portion which is in communication with the cavity;
   a valve needle movably arranged in the cavity, wherein the valve needle is operable at an open position for opening the valve port portion and a closed position for blocking the valve port portion;
   a drive mechanism having a rotor and a coil surrounding an outer circumference of the rotor;
   a planetary gear deceleration mechanism having a planetary carrier, a planetary gear and a gearbox, wherein the rotor, the planetary carrier and the gearbox are coaxially arranged, the drive mechanism serves as an input end of the planetary gear deceleration mechanism, the rotor is fixedly connected to the planetary carrier to drive the planetary carrier to rotate along an axis of the rotor, the planetary carrier is provided with a first mounting shaft, the planetary gear is sleeved on the first mounting shaft, the gearbox comprises a box body fixedly arranged on the valve seat, a fixed inner gear ring arranged on the box body and an output inner gear ring moveably arranged in the box body, the planetary gear extends into the box body and is meshed with the fixed inner gear ring and the output inner gear ring; and
   a transmission mechanism having a nut fixed on the valve seat and a screw rod which is matched with an internal thread of the nut, a first end of the screw rod is fixedly connected to the output inner gear ring.

2. The electronic expansion valve according to claim 1, further comprising:
   a housing covering an upper portion of the valve seat and supported by the valve seat, wherein the housing has an accommodating space, the rotor, the planetary gear deceleration mechanism and the transmission mechanism are arranged in the accommodating space, the coil surrounds an outer circumference of the housing.

3. The electronic expansion valve according to claim 2, wherein the planetary gear deceleration mechanism further comprises a mandrel, the mandrel sequentially passes through a top frame, the planetary carrier and the screw rod from top to bottom, and the mandrel is in clearance fit with the top frame, the planetary carrier and the screw rod.

4. The electronic expansion valve according to claim 3, wherein a vibration reduction member is a vibration reduction spring, the vibration reduction spring is sleeved on the mandrel, a first end of the vibration reduction spring abuts against a bottom surface of the top frame, a second end of the vibration reduction spring abuts against a top surface of the planetary carrier.

5. The electronic expansion valve according to claim 4, wherein a positioning groove is arranged on the top surface of the planetary carrier, the second end of the vibration reduction spring abuts against a bottom of the positioning groove.

6. The electronic expansion valve according to claim 1, wherein
   the rotor is integrally formed with the planetary carrier by injection molding; or
   the screw rod is integrally formed with the output inner gear ring by injection molding; or
   the rotor is integrally formed with the planetary carrier by injection molding, and the screw rod is integrally formed with the output inner gear ring by injection molding.

7. The electronic expansion valve according to claim 1, wherein the fixed inner gear ring is integrally formed with the box body by injection molding.

8. The electronic expansion valve according to claim 1, wherein the number of the first mounting shaft is one or more, and the first mounting shaft is arranged along a peripheral direction of the planetary carrier, and the planetary gear is arranged in one-to-one correspondence with the first mounting shaft.

9. The electronic expansion valve according to claim 1, wherein the planetary gear deceleration mechanism further comprises a cover plate, the cover plate is provided with a mounting hole, the cover plate covers a lower end of the planetary carrier, a lower end of the first mounting shaft is inserted into the mounting hole.

10. The electronic expansion valve according to claim 1, further comprising:
    a valve needle sleeve sleeved on the valve needle and fixedly arranged on the valve seat, wherein the valve needle is movably arranged in the valve needle sleeve, the valve needle sleeve comprises a mounting section and a guiding section located below the mounting section, a step surface is formed at a connection position of the mounting section and the guiding section, the guiding section is matched with the valve needle; and
    a spring arranged in the mounting section, wherein an end of the spring abuts against an abutting convex at a top of the valve needle, another end of the spring abuts against the step surface, and in a case that the valve needle moves from the closed position to the open position, an upward elastic restoring force is applied to the valve needle by the spring.

11. The electronic expansion valve according to claim 1, wherein an end of the box body is arranged with a folded portion, the folded portion is fixedly connected to the valve seat; another end of the box body is fixedly connected to the fixed inner gear ring.

12. The electronic expansion valve according to claim 11, wherein the box body is provided with a through portion extending through the box body, the fixed inner gear ring is fixed with the box body by injection molding, the through portion is filled with the fixed inner gear ring.

13. The electronic expansion valve according to claim 12, wherein a cross-section of the through portion is circular, rectangular or irregular, the number of the through portion is one or more, and the through portion is uniformly distributed at a peripheral wall of the box body.

14. The electronic expansion valve according to claim 1, wherein the planetary gear deceleration mechanism further comprises a mandrel, the mandrel sequentially passes through a top frame, the planetary carrier and the screw rod from top to bottom, and the mandrel is in clearance fit with the top frame, the planetary carrier and the screw rod.

15. A refrigeration system, comprising an electronic expansion valve, wherein the electronic expansion valve comprises:
    a valve seat having a cavity and a valve port portion which is in communication with the cavity;
    a valve needle movably arranged in the cavity, wherein the valve needle is operable at an open position for opening the valve port portion and a closed position for blocking the valve port portion;
    a drive mechanism having a rotor and a coil surrounding an outer circumference of the rotor;
    a planetary gear deceleration mechanism having a planetary carrier, a planetary gear and a gearbox, wherein the rotor, the planetary carrier and the gearbox are coaxially arranged, the drive mechanism serves as an input end of the planetary gear deceleration mechanism, the rotor is fixedly connected to the planetary carrier to drive the planetary carrier to rotate along an axis of the rotor, the planetary carrier is provided with a first mounting shaft, the planetary gear is sleeved on the first mounting shaft, the gearbox comprises a box body fixedly arranged on the valve seat, a fixed inner gear ring arranged on the box body and an output inner gear ring moveably arranged in the box body, the planetary gear extends into the box body and is meshed with the fixed inner gear ring and the output inner gear ring; and
    a transmission mechanism having a nut fixed on the valve seat and a screw rod which is matched with an internal thread of the nut, a first end of the screw rod is fixedly connected to the output inner gear ring.

\* \* \* \* \*